United States Patent [19]

Gernhardt et al.

[11] 4,049,570

[45] Sept. 20, 1977

[54] METHOD AND APPARATUS FOR REMOVING VAPORS AND AEROSOLS FROM GASES PRODUCED IN A GASIFICATION PLANT

[75] Inventors: Paul Gernhardt, Bochum; Wolfgang Grams, Wanne-Eickel; Siegfried Pohl; Wilhelm Danguillier, both of Bochum, all of Germany

[73] Assignee: Dr. C. Otto & Comp. G.m.b.H., Bochum, Germany

[21] Appl. No.: 601,266

[22] Filed: Aug. 4, 1975

[30] Foreign Application Priority Data

Oct. 5, 1974   Germany ............................ 2447563

[51] Int. Cl.$^2$ .................... C01B 2/02; C10B 49/14
[52] U.S. Cl. .................................. 252/373; 23/259.5; 23/262; 23/267 R; 23/281; 48/92; 48/203; 48/206; 48/210
[58] Field of Search ................. 252/373; 48/197, 203, 48/206, 210, 92

[56] References Cited

U.S. PATENT DOCUMENTS

| | | | |
|---|---|---|---|
| 1,925,490 | 9/1933 | Lichtenberger | 48/206 |
| 2,461,021 | 2/1949 | Atwell | 48/206 |
| 2,593,257 | 4/1952 | Bradley et al. | 48/210 |
| 2,647,045 | 7/1953 | Rummel | 48/206 |
| 2,687,950 | 8/1954 | Kalbach | 48/210 |
| 2,848,473 | 8/1958 | Rummel et al. | 48/210 X |
| 3,567,412 | 3/1971 | Lefrancois et al. | 252/373 |
| 3,852,048 | 12/1974 | Pyle | 48/209 |

*Primary Examiner*—Howard T. Mars
*Attorney, Agent, or Firm*—Brown, Murray, Flick & Peckham

[57] ABSTRACT

The high temperature gasification of solid fuel or mixtures of solid and liquid fuels is carried out by a method and apparatus wherein the gasified product from a high temperature gasification chamber having a slag bath therein is fed into a first dust collector. Gases, including vapors or aerosols, are fed from the dust collector into a waste heat boiler to reduce the temperature of the gases down to about 250° C. The solids which essentially include flue coke are discharged from the dust collector into a separate heat exchanger wherein the temperature of the solids is reduced down to about 200° C. The cooled solids and the cooled gases are fed into an absorption chamber wherein for a period of 1 to 10 seconds, the aerosols are absorbed into the flue coke. The absorption chamber is connected to a second dust collector that separates the gases from the flue coke having the absorbed aerosols. The purified gases are then discharged from the second dust collector and the flue coke with the absorbed aerosols is returned to the slag bath in the gasification chamber.

6 Claims, 1 Drawing Figure

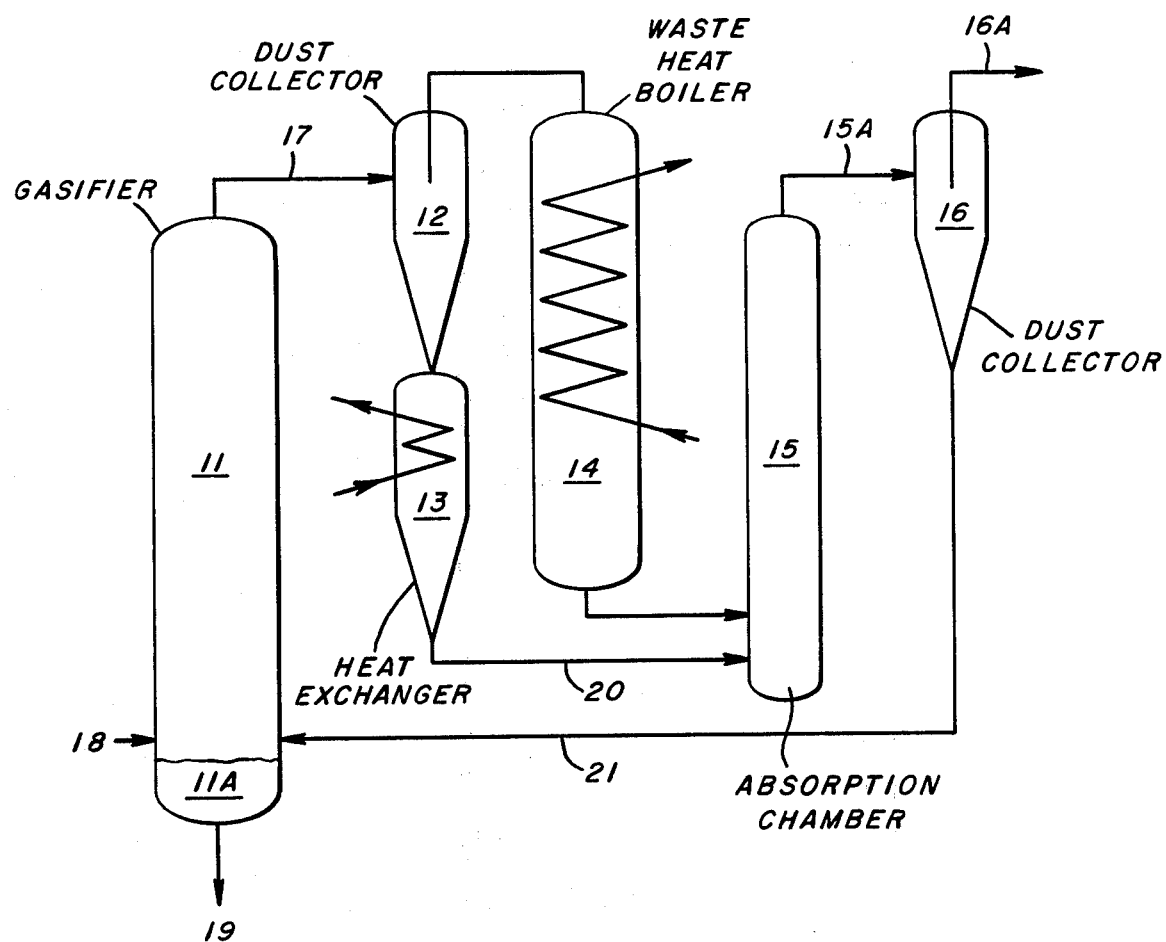

METHOD AND APPARATUS FOR REMOVING VAPORS AND AEROSOLS FROM GASES PRODUCED IN A GASIFICATION PLANT

BACKGROUND OF THE INVENTION

This invention relates to a method and apparatus for removing vapors and aerosols from gases produced by a high temperature gasification process, particularly such as a process to gasify solid fuels. More particularly, the present invention is addressed to the removal of harmful substances in the form of vapors or aerosols from the gases liberated by such a process at a location which is downstream of a gasification chamber and the return of such vapors or aerosols to undergo processing in the gasification chamber.

When finely-divided solid fuel is gasified, for example, at a high temperature in a slag bath generator, the fuel is injected together with a gasifying medium in the form of, for example, oxygen, steam or $CO_2$, by a set of nozzles into a melting chamber of the generator. During such a process, the bottom of the melting chamber is covered with a liquid slag bath formed from the mineral constituents of the fuel. The resulting gases liberated during the process consist chiefly of carbon monoxide and hydrogen. These gases are cooled by injecting cold gases into the top of the gasifier chamber whereby the liberated gases are drawn off from the chamber at a temperature within the range of 800° C to 1000° C.

As is known, these gases have been conducted into a dust collector in which most of the entrained solid particles are separated and deposited in the collector. The gases were then conveyed into a waste heat boiler where they are cooled down to about 250° C before the gases are fed into gas scrubbers and collers located downstream of the waste heat boiler. The solid particles deposited in the dust collector consist mainly of flue coke; that is, pulverulent high temperature coke which is recycled into the reactor for gasification. The amount of coke recovered in the dust collector lies between 10% and 20% of the fuel used in the gasification chamber. During this high temperature gasification process, a number of lower boiling point chemical compounds is produced and evaporate, particularly when solid fuels such as coal are gasified under reducing conditions above the melting point of the mineral constituents of the coal.

The presence of lower boiling point chemical compounds depends, of course, upon the composition of the mineral substances in the coal which is used. However, these compounds are generally in the form of oxides, sulfides, sulfates and chlorides of silicon, potassium, calcium, sodium, magnesium, aluminum, iron and phosphorus. Thus, for example, the following compounds can be detected in gasified products: $SiS$, $SiS_2$, $SiO$, $K_2O$ and $Na_2O$. See, for example. W. Gumz et al, Schlackenkunde, Springer 1958. In addition, compounds such as $NaCl$, $Na_2SO_4$, $Na_2S_2O_7$, $Na_2S$, $KCl$, $K_2SO_4$, $K_2S_2O_7$, $K_2S_5$, $CaCl$, $CaS$, $CaSO_4$, $MgSO_4$, $Fe_2(SO_4)_3$, $FeS$, $FeS_2$, $Al_2(SO_4)_3$, $Al_2S_3$, $P_4S_{10}$ and $P_4S_3$ may occur in the form of vapors or aerosols. These compounds are detectable in the gas stream when corresponding constituents are present in the minerals contained in the charging materials. These substances may also evaporate from the solid minerals present in the gas stream depending upon the partial pressure of the substances.

With regard to the aforementioned compounds which are soluble in water, such compounds are usually washed out of the gas by scrubbers located downstream of the gasification chamber. As a result, contamination of additional waste water and the environment occurs. With regard to those compounds which are not soluble in the washing solutions used in scrubbers or the like, these compounds either remain in the gas stream, i.e., reappear in the end product or, if the compounds in the gas reach a suitably low temperature, the compounds are deposited in the pipes, packed columns, valves, pumps, etc. in the gas purification plant. This, of course, produces premature stoppages and breakdowns of the purification plant or system.

SUMMARY OF THE INVENTION

It is an object of the present invention to provide a method and apparatus to remove the harmful substances from a gas mixture produced during a gasification process, particularly a gasification process for solid fuel, wherein the harmful substances are removed from the gasified product in a manner which does not contaminate additional waste water or cause undesirable deposits in downstream purification equipment of the plant.

More particularly, according to the present invention, there is provided a method of high temperature gasification of solid fuel, or a mixture of solid and liquid fuels by feeding such fuels into a gasification chamber of the type which includes a melting chamber and from which a mixture of gases and solids is discharged, the method including the steps of separating the mixture discharged from the gasification chamber into a gas phase including aerosols or vapors and into a solid phase which essentially includes flue coke, separately cooling both the gases and the solids after separation thereof, combining the cooled gases and the cooled solids within a chamber for the absorption of aerosols or vapors from the gases by the flue coke, separating the flue coke including the absorbed aerosols or vapors from the gases, and returning the flue coke including the absorbed aerosols or vapors into the melting chamber of the gasification chamber.

The method of the present invention is more particularly characterized by the fact that the mixture of gases leaving the gasification chamber and after traveling through the dust collector is cooled down to a temperature of approximately 250° C in a waste heat boiler from where the gases are conveyed into an absorption chamber which is also fed with flue coke recovered from the dust collector and after the flue coke has been cooled to a temperature of between 100° C to 300° C, preferably to a temperature of 200° C. From the absorption chamber, the flue coke charged with harmful substances in the form of vapors or aerosols from the gases, is separated from the gases in a second dust collector and then the flue coke is returned to the melting chamber. The residence time of the cooled flue coke and the cooled gases in the absorption chamber is controlled to lie within the range of 1 to 10 seconds, preferably 5 seconds.

The harmful substances occurring mainly in the form of vapors or aerosols are effectively removed according to the process and the apparatus employed to carry out the process. The removal of such substances occurs firstly by the absorption of the harmful substances into the flue coke in the absorption chamber and finally the harmful substances combine with the liquid slag covering the bottom of the gasifier. The carbon in the flue coke is gasified, whereas the high boiling point mineral constituents of the flue coke are either directly removed by the slag bath or recycled when they are entrained in the form of liquid droplets in the gas stream. In this manner, the downstream parts of the plant as, for example, the scrubbers and waste water systems, are largely protected from contamination by these harmful substances.

The present invention also relates to a plant embodying apparatus for performing the aforementioned method wherein a gasification chamber includes a molten bath generator for the high temperature gasification of fuel, particularly solid fuel, and a dust collector downstream of the chamber. The apparatus of the present invention further includes the combination comprising a heat exchanger for cooling the flue dust including flue coke deposited in the dust collector and an absorption chamber coupled to the heat exchanger by a supply line for conducting the cooling flue dust. The absorption chamber is also connected to a waste boiler employed for cooling the gas mixture discharged from the dust collector. A second dust collector is connected to the absorption chamber from where the flue dust separated thereby is fed into the molten bath generator for deposit into the slag bath in the gasification chamber.

These features and advantages of the present invention as well as others will be more fully understood when the following description is read in light of the accompanying drawing which is a schematic illustration of the apparatus and method of the present invention.

As shown in the drawing, a gasification chamber 11 includes a melting chamber 11A in the bottom thereof. Oxygen, steam and carbon are introduced by a set of nozzles 18 into chamber 11. The gasification chamber takes the form of a molten bath generator which produces or develops the slag bath therein such as in the melting chamber 11A. This type of gasification chamber is well known in the art per se. Slag is withdrawn from the bottom of the gasification chamber by line 19. The bases liberated by the gasification process consist mainly of carbon monoxide and hydrogen together with harmful substances in the form of vapors or aerosols as hereinbefore described. The gasified product is discharged from the top of the gasification chamber through line 17 into a dust collector 12. The dust collector 12, which is the first of two dust collectors employed according to the present invention, separates the received gasification mixture into solids essentially including flue coke and into gases that include the harmful aerosols or vapors. The dust collector is coupled by a gas discharge line to a waste heat boiler 14 wherein the gases are cooled down to a temperature within the range of 300° C to 100° C, and preferably to about 250° C. The cooled gases are then conveyed from the waste heat boiler into an absorption chamber 15. The gases fed into chamber 15 include vapors or aerosols which have not as yet sublimed or solidified.

The solids which are separated by the dust collector 12 and essentially include hot flue coke, are cooled in a heat exchanger 13 down to a temperature within the range of 100° C to 300° C, preferably down to about 200° C. These solids are then conveyed into the absorption chamber 15 by line 20. The residence time in the absorption chamber 15 of the cooled solids and the cooled gases is controlled by adjusting the flow rate through the use of suitable well-known means so that the residence time lies within the range of 1 to 10 seconds, and preferably 5 seconds. The absorption chamber is employed in a manner so that the low boiling point and harmful substances in the form of aerosols or vapors in the gases can be absorbed into the flue coke.

The cooled flue coke charged with harmful substances together with the gases are discharged from the absorption chamber 15 by line 15A into a second dust collector 16 where the cooled flue coke with the absorbed aerosols or vapors is separated from the gas stream. Line 16A discharges the gas from dust collector 16 to downstream processing equipment; whereas line 21 also coupled to the dust collector 16, conveys the flue coke charged with the harmful substances in a recycling manner into the melting chamber of the gasifying chamber 11. By this recycling, the carbon in the fuel coke is gasified. The high boiling point mineral constituents absorbed in the flue coke are either directly removed by the removal of slag from the slag bath or they are recycled if they are in the form of liquid droplets entrained by the gas stream passing along the column height of the gasifying chamber. The evaporating substances, more particularly the harmful substances absorbed by the flue coke, increase the partial pressure of their individual constituents, thus increasing the efficiency with which they are removed by the slag bath. During steady-state conditions, the amount of harmful substances removed by the slag bath and subsequently discharged in the form of solid granulated slag is equal to the amount of such substances introduced by the fresh charge of fuel so that nearly all of the mineral constituents of the fuel are discharged in the form of slag.

During steady-state conditions, there is an increase in the proportion of vapors and aerosols in the gas phase in the gasifier 11. The cooled flue coke injected into the absorption chamber 15 can absorb such large amounts of vapors and aerosols of low boiling point substances such that these substances are almost completely absorbed, recycled to the gasifier and finally discharged with the slag. Consequently, the downstream parts of the gasification plant, such as scrubbers and waste water systems, are largely protected from contamination by these substances.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In a process for removing vapors or aerosols from the product of high temperature gasification of solid fuel or a mixture of solid and liquid fuels wherein the fuel is fed into a gasification chamber of the type including a melting chamber therein having a slag bath at the bottom thereof, and wherein a mixture of gases and solids is discharged from the top of the gasification chamber at a temperature within the range of 800° C to 1000° C and slag is normally discharged from the bottom of the gasification chamber, the improvement comprising the steps of:

separating said mixture after discharge from the gasification chamber into a gas phase including aerosols and into a solid phase which essentially includes flue coke, separately cooling at least down to a temperature within the range of 300° C to 100° C both the gases and the solids after separation thereof, combining the cooled gases and the cooled solids for a period of 1 to 10 seconds within a chamber for the absorption of aerosols by the flue coke from the gases, separating flue coke including the absorbed aerosols from the remaining gases consisting cheifly of carbon monoxide and hydrogen, discharging said remaining gases, returning the flue coke including the absorbed aerosols to said melting chamber for gasification of the flue coke, and discharging aerosols together with slag from the bottom of said gasification chamber.

2. The method according to claim 1 wherein the gases are cooled after separation from the solids to a temperature of about 250° C before said step of combining the cooled gases.

3. The method according to claim 1 wherein the solids are cooled after separation from the gases to a temperature of about 200° C before said step of combining the cooled gases.

4. The method according to claim 1 wherein said mixture is fed into a dust collector for said step of separating said mixture and wherein said gases after separation are fed into a waste heat boiler for said step of separately cooling both the gases and the solids.

5. The method according to claim 4 wherein the flue coke with the absorbed aerosols and the gases are fed into a dust collector for said step of separating the flue coke including the absorbed aerosols from the remaining gases.

6. The method according to claim 1 wherein the cooled gases and the cooled solids remain in a chamber during said step of combining for a period of 5 seconds.

* * * * *